United States Patent [19]

Migita et al.

[11] Patent Number: 4,634,266

[45] Date of Patent: Jan. 6, 1987

[54] ELECTROPHOTOGRAPHIC COPYING MACHINE WITH PICTURE POSITION SELECTION FUNCTION

[75] Inventors: Haruyoshi Migita, Nara; Shoichiro Yoshiura, Yamatokoriyama, both of Japan

[73] Assignee: Sharp Kabushiki Kaisha, Osaka, Japan

[21] Appl. No.: 762,389

[22] Filed: Aug. 5, 1985

[30] Foreign Application Priority Data

Aug. 6, 1984 [JP] Japan ................................ 59-166852

[51] Int. Cl.⁴ ................................................ G03B 27/52

[52] U.S. Cl. .................................... 355/55; 355/14 R; 355/61

[58] Field of Search ........................ 355/55, 56, 3 R, 8, 355/14 R, 57, 59, 61

[56] References Cited

U.S. PATENT DOCUMENTS 4,277,163 7/1981 Ikesue et al. ...................... 355/56 X

*Primary Examiner*—Richard A. Wintercorn

*Attorney, Agent, or Firm*—Birch, Stewart, Kolasch & Birch

[57] ABSTRACT

The preferred embodiments provide a copying machine having a variable magnification copying function which includes a circuit for detecting or entering the length of each side of an irregular-sized document and a calculating circuit for operating the magnification ratio using the length of each side of the irregular-sized document and the length of each side of the set copy paper; a copying machine having a picture position setting function which includes a second operating circuit which calculates the product of the length of the lateral side of a document and the above-mentioned magnification ratio and further determines the difference between this operation result and the length of the lateral side of the copy paper; a display circuit for displaying this operation result as an allowable blank range, a circuit for distributing the blank spaces to the left and right sides, the allowable blank range displayed by this display circuit and a circuit for controlling the timing of copy paper feeding in response to the amount of margin to be allocated.

3 Claims, 6 Drawing Figures

FIG. 1
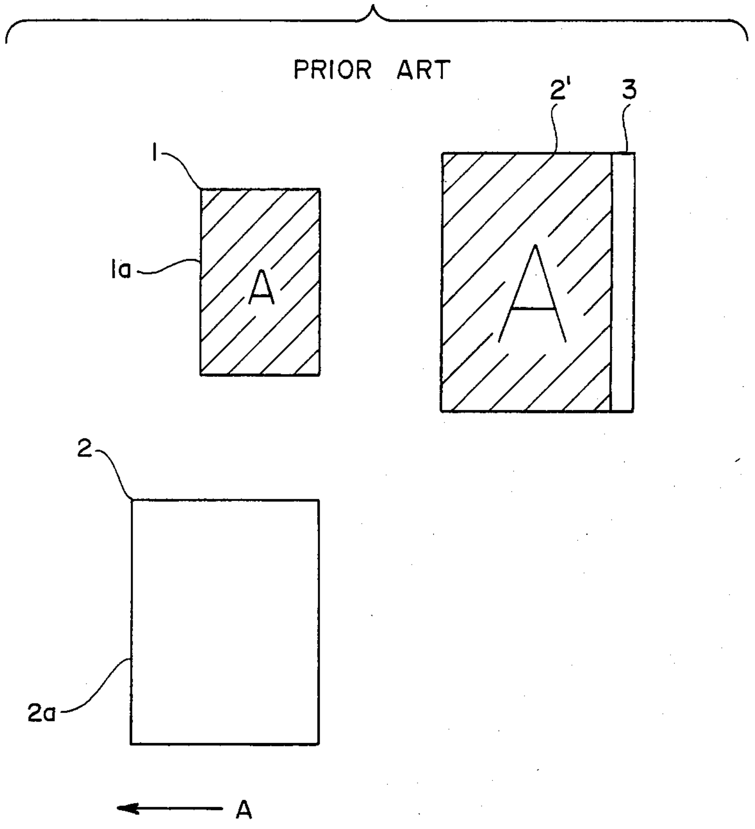
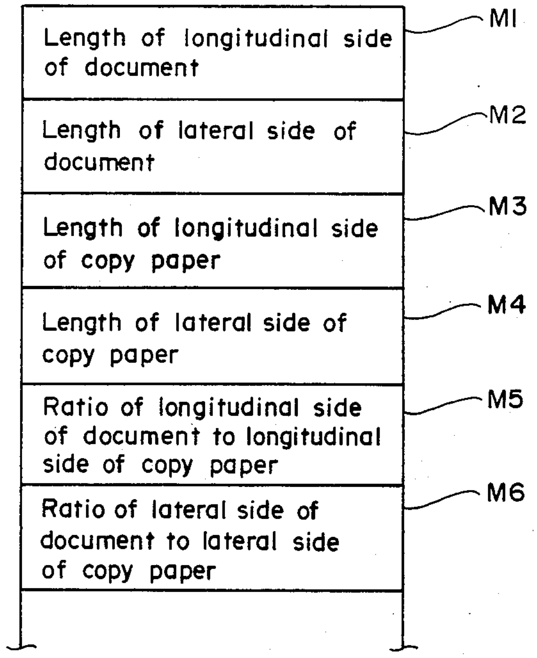
FIG. 6

ELECTROPHOTOGRAPHIC COPYING MACHINE WITH PICTURE POSITION SELECTION FUNCTION

BACKGROUND OF THE INVENTION

The present invention relates to a copying machine capable of copying an irregular-sized document onto regular-sized copy paper in variable magnifications, and specifically relates to a copying machine capable of changing the picture position when a blank is produced in the direction the copy paper is fed.

In recent years, as copying machines have become increasingly multi-functional, providing among other things, a function to copy an irregular-size document onto irregular-sized copy paper in variable magnifications.

This machine detects or inputs the lengths of the longitudinal and lateral sides of an irregular-sized document by a detecting apparatus on the document table or an inputting apparatus on an operating part to store them in a RAM, and also reads out the set length of each side of copy paper from a ROM storing the usable regular sizes in advance, working to the ratio of the longitudinal and lateral lengths of both. Furthermore, this machine compares the ratio of the longitudinal sizes with the ratio of the lateral sizes to select the ratio of smaller numeric value as the magnification to employ. For example, as shown in FIG. 1, where an irregular-sized document 1 having a length of a=150 mm and width of b=100 mm is copied in a variable magnification fashion onto A4 size copy paper, 297 mm×210 mm, by feeding the copy paper in the direction shown by arrow A, the longitudinal ratio is 297÷150=1.98, and the lateral ratio is 210÷100=2.1. In this case, ratio 1.98 is employed as the magnification ratio, and, as shown, on copied paper 2', a picture is formed in the longitudinal direction. In the lateral direction, a picture of 198 mm, the product of the length of the lateral side of the document, 100 mm, and the magnification ratio of 1.98, is formed.

However, in conventional copying machines, the timing relationship of feeding the copy paper to starting the operation of the copying machine, is always constant. That is, the copy paper is fed to the copying apparatus so that the position of the picture at the front end portion of the document table in the direction of copy paper feeding will coincide, in the copying apparatus, with the front end of the copy paper in the direction of feeding. For this reason, in FIG. 1, document 1 is copied in such a manner that the front end portion 1*a* of the document 1 coincides with the front end portion 2*a* of the copy paper 2, and, as shown in the copied paper 2', a blank portion 3 of 210 mm−198 mm=12 mm is produced at the rear. This blank portion 3 is always produced when the longitudinal ratio is selected as the magnification ratio as described above, being produced at the rear portion of the copy paper in the direction of feeding the copy paper. For this reason, the paper copied in the above-described situation suffers the disadvantages that the picture position always deviates, resulting in non-legibility of the contents and part of the picture being sometimes hidden behind the binder part of the file when filing. In order to eliminate such disadvantages of conventional copying machines, the document is moved backward the requisite distance from the normal reference position when setting the document on the document table. Also, a troublesome calculation is required to accurately calculate the distance the document is to be moved, Otherwise, small movements may have to be repeated until the optimum copying position is reached, but this results in many failed copies and waste. In either case, the copying operation takes a long time and is also troublesome, thereby having the disadvantage of appreciably reducing the running efficiency of the copying machine.

SUMMARY OF THE INVENTION

In light of the conventional disadvantages as described above, the purpose of the present invention is to provide a copying machine capable of improving running efficiency by reducing the copying operation time and simplifying the copying operation in a manner such that when copying an irregular-sized document in a variable conversion fashion onto regular-size copy paper, the position of the copied picture on the copy paper is made variable without adjusting the setting position of the document.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art.

Briefly, an electrophotographic copying machine with a picture portion selection function embodied by the present invention comprises: a copying machine having a variable magnification copying function and an operating means which calculates the product of the length of the lateral side of the document and the magnification ratio when the longitudinal ratio is selected as the variable magnification to copy irregular-sized documents onto regular-size copy paper, a means to calculate the difference between this result and the length of the lateral side of the copy paper, a means to display the result of this operation as the range within which the blank can be set; a means to distribute to the right and left the range wherein the blank can be set by this display means, and a means to control the timing of feeding the copy paper in response to the allowable margin.

BRIEF DESCRIPTION OF THE DRAWINGS

The present invention will be better understood from the detailed description given hereinbelow and the accompanying drawings which are given by way of illustration only, and thus are not limitative of the present invention in which:

FIG. 1 of the drawings show the formation of a picture by a conventional copying machine.

FIG. 6 is a view showing the major parts of the memory areas of a RAM in the same copying machine.

DESCRIPTION OF THE INVENTION

Figure 3:
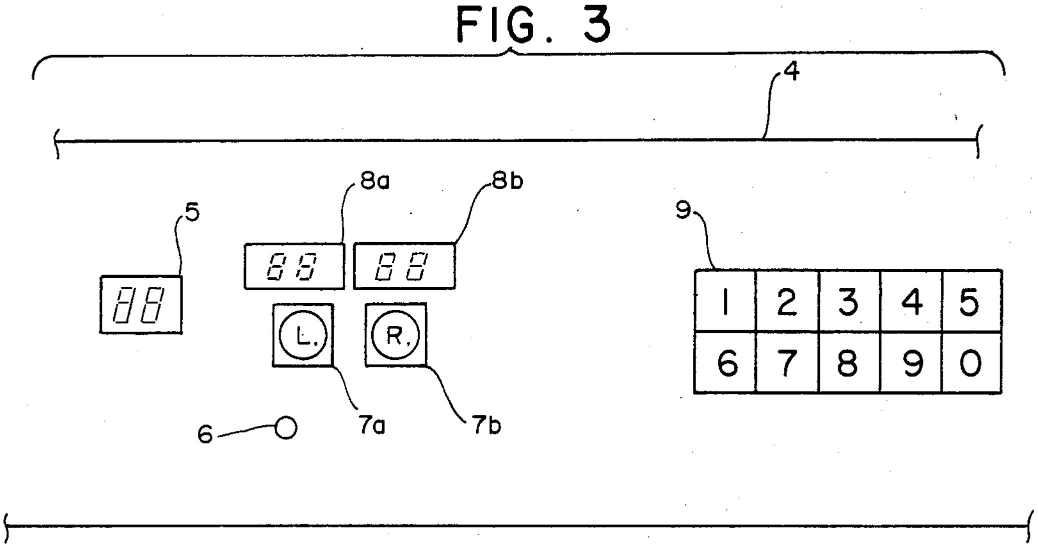
FIG. 3 is a view of an operating part of the same copying machine.

FIG. 3 is a view of an operating part of a copying machine having a function of setting the picture position in accordance with the preferred embodiment of the present invention.

A ten-key panel 9 employed to enter the numeric value of the quantity to be set is placed on the right side of the operating part 4. On the left side of the panel, an allowable blank copy range display 5 displays the length in the direction of feeding paper of the blank portion produced on the copy paper as the allowable blank. Below on the right side of this display, the allowable blank copy range display 6 is installed, which lights to inform the operator when the ratio of the longitudinal sizes is taken as the magnification ratio and a blank is produced on the copy paper. Above this display are, firstly, blank setting entering keys 7*a* and 7*b* which are pressed when distributing the blank range to the left and right of the copying paper and, secondly, blank displays 8*a* and 8*b* which display the entered numeric value. For example, where the displayed numeric value within which the blank can be set is 12 mm, when copying at the center position is intended, first the left blank setting entering key 7*a* is pressed and subsequently key "6" of the ten-key panel 9, this numeric value thereby being displayed on the left blank display 8*a*. Thereafter, the right blank setting entering key 7*b* is pressed and, subsequently, key "6" of the ten-key panel 9 pressed; this numeric value is thereby displayed on the right blank display 8*b*.

Figure 4:
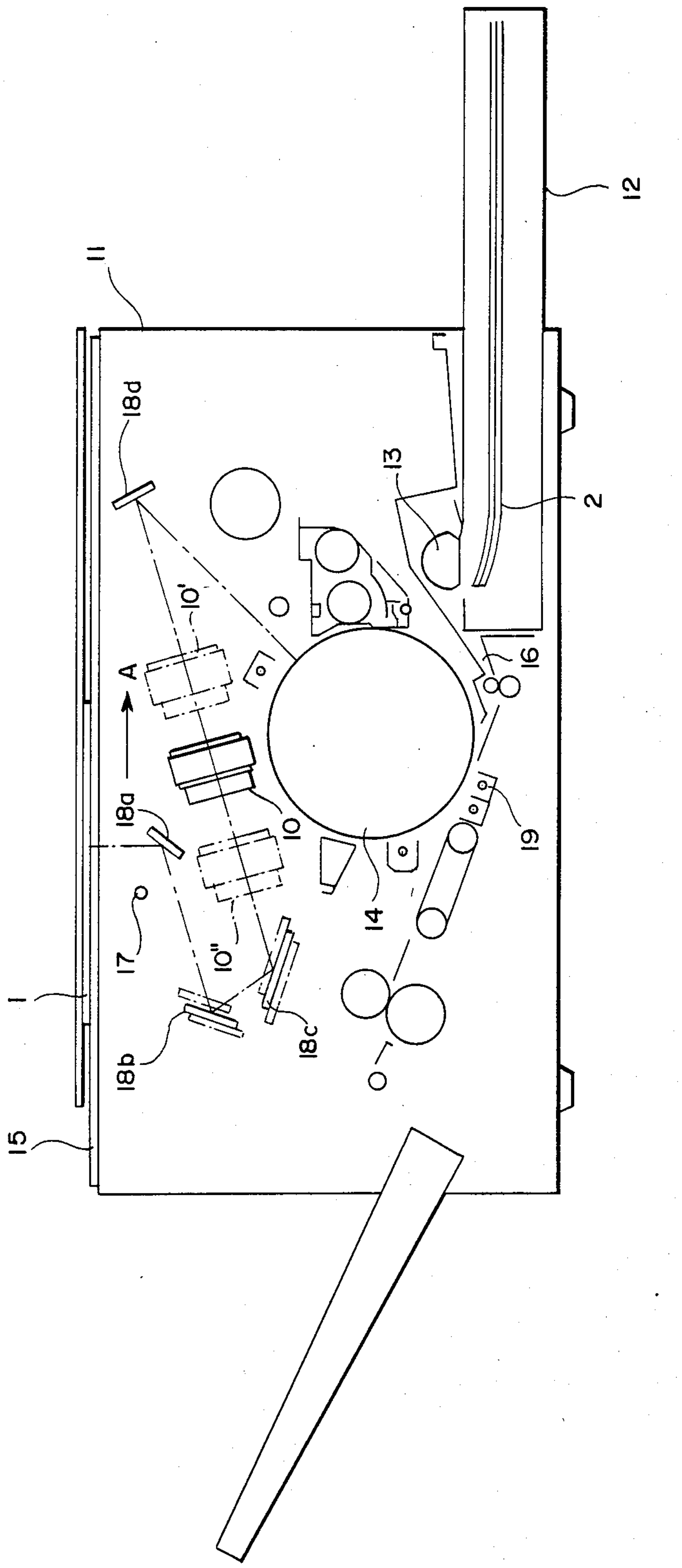
FIG. 4 is a cross-sectional view of the same copying machine.

FIG. 4 is a cross-sectional view showing the structure of a copying machine in accordance with an embodiment of the present invention.

A document 1 is set in the reference position of the document table 15 at the front of the copying machine main unit 11, and the start button (not illustrated) is operated. Thereupon, reflecting mirrors 18*a* and 18*b* scan under the document table in the direction of the arrow A, and the light from a light source 17 reflected from the document 1 is distributed over a photosensitive drum 14 rotating synchronous with an optical system.

A lens 10 is installed so as to be movable between 10′ and 10″, and the position thereof is controlled in response to the magnification ratio. Copy paper 2 is stored in a copy paper cassette 12 and fed toward a transfer path 16 by means of a rotating semicircular roller 13. In normal operation, such as copying regular-sized documents or the like, the timing of starting to feed the paper is set in such a manner that the position of starting the scanning of the optical system is such that the surface portion of the photosensitive drum 14 corresponding to the reference position of the document table and the front end portion of the copy paper 2 face each other at the position of copying charger 19. In the case where a blank is produced by copying an irregular-sized document to a variable magnification ratio and the distribution of the blank is set on the left side of the copy paper, the timing of starting feeding the paper as described above is brought forward by the set numeric value divided by the speed of the paper feed, thereby forming the picture at the position intended by the operator on the copy paper 2.

Figure 5:
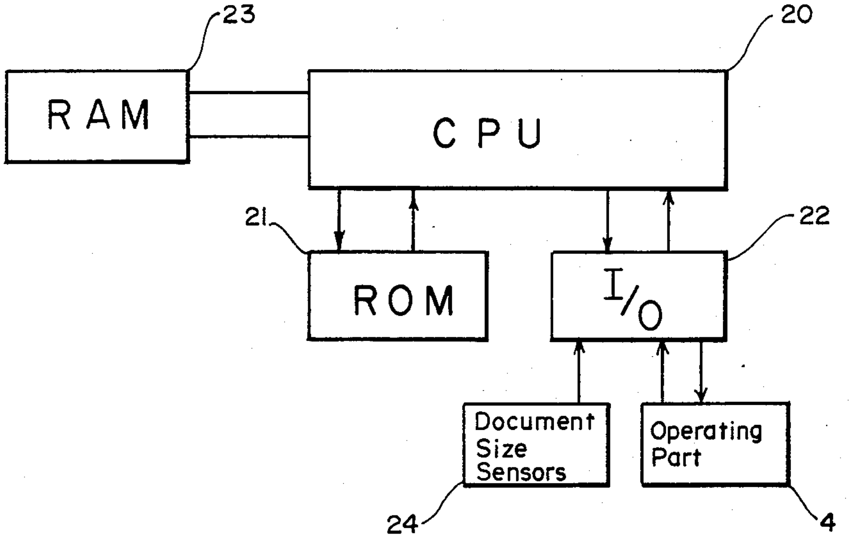
FIG. 5 is a block diagram of the same copying machine.

FIG. 5 is a block diagram of a copying machine having the function of setting the picture position in accordance with an embodiment of the present invention.

A ROM 21 stores a program for controlling various operations of the copying machine and the dimensions of usable regular sizes, an I/O 22 connecting the operating part 4 and a document sensor 24, and a RAM 23 storing the input signal and the operation results from this I/O 22 are connected to a CPU 20 through an inner bus.

FIG. 6 is a view showing the major part of the memory areas in the RAM 23. The document size detected by the document size sensor is stored in areas M1 and M2, the copy paper size is stored in areas M3 and M4, and the longitudinal ratios and the lateral ratios of the document and the copy paper are stored in areas M5 and M6, respectively.

Figure 2:
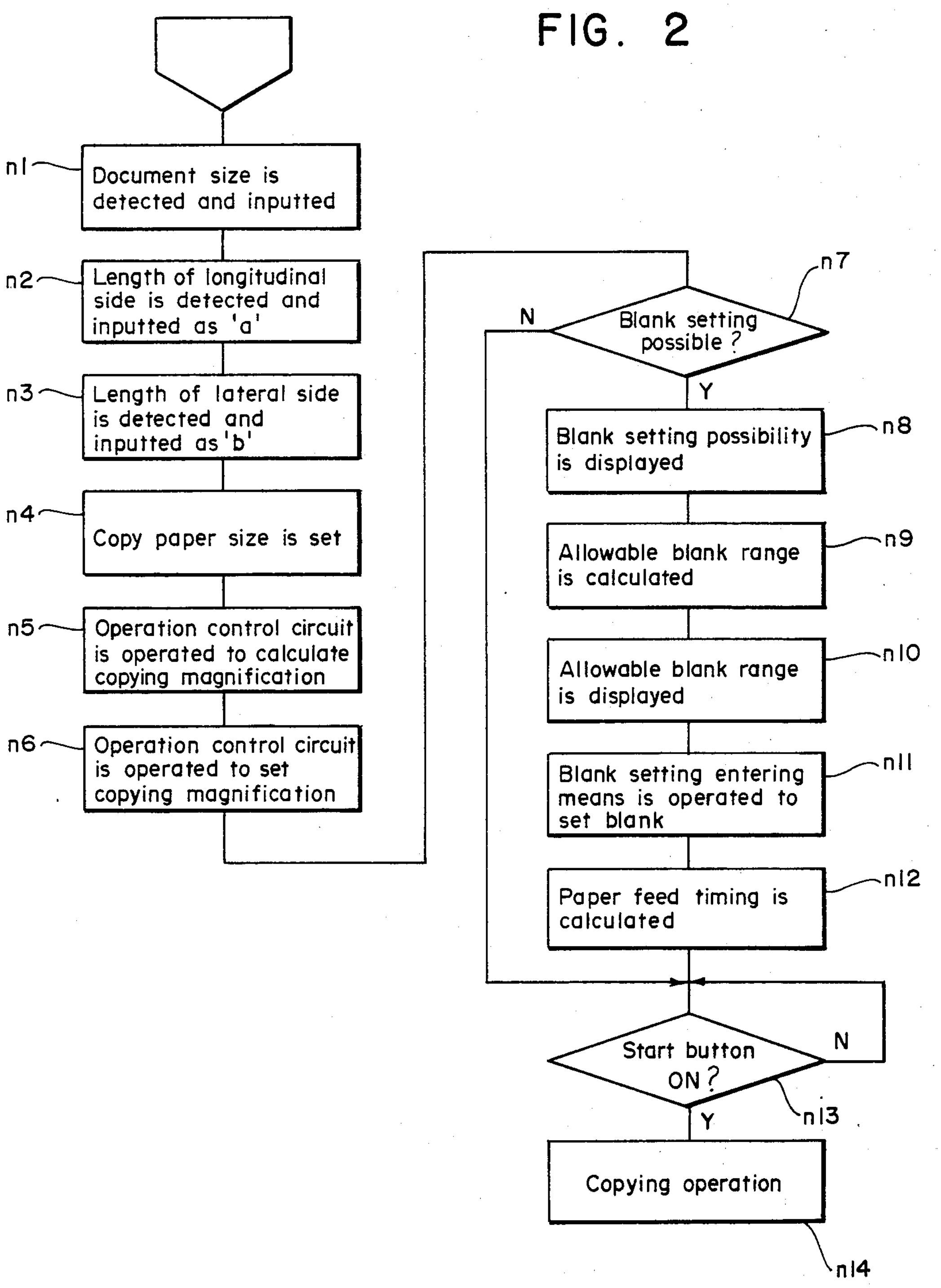
FIG. 2 is a flowchart showing the operation of a copying machine in accordance with an embodiment of the present invention.

FIG. 2 is a flowchart showing the operation of a copying machine having the function of setting the picture position embodied in accordance with an embodiment of the present invention.

When an irregular-sized document is set on the document table and the variable magnification copying mode is selected by the operator, the document size sensor detects the document size in step n1, and the length of the longitudinal side a and the length of the lateral side b detected in steps n2 and n3 are stored in the memory areas M1 and M2 of the RAM, respectively. Subsequently, when the copy paper size is set in step n4, the lengths of the longitudinal and lateral sides are read from the ROM, being stored in the memory areas M3 and M4, respectively. In step n5, the ratios of the longitudinal length and lateral length of the copy paper to those of the document stored in the memory areas M1 and M2 are operated respectively, and the ratio of longitudinal sizes is stored in the memory area M5 and the ratio of lateral sizes in the memory area M6. The smaller numeric value of the operation result is selected as the magnification ratio in step n6, and in step n7 a blank is produced at the rear part in the direction of paper feed and the decision is made as to whether or not the blank setting can be made, that is, the ratio of longitudinal sizes has been selected as the magnification ratio in step n6. When the blank setting is possible according to step n7, the processing proceeds to step n8, and the allowable blank copy range display 6 of the operating part 4 is lit. In step n9, operation of $M4-(M2\times M5)$ is performed to calculate the range for blank setting, that is, the length of the blank portion in the direction of the paper feed. Subsequently, in step n10, this operation result appears on the display 5 which indicates the range within which the blank can be set and the blank is allocated to the right and left by the above-described operations of the blank setting entering keys 7*a* and 7*b* and the ten-key panel 9 in step n11. Thereafter, the timing of feeding the paper is decided in step n12 and when the start button is depressed in step n13, the processing proceeds to step n14 to start the copying operation. At this time, the paper feeding apparatus starts operating prior to the starting of the copying apparatus by the amount of the operation result. When no blank setting can be made in step n7, the processing proceeds directly to step n13, and, in this case, the paper feeding apparatus starts operating synchronous with the other copying operations in step n14.

In the above-described operation, step n5 corresponds to the operating means of the present invention and step n8 corresponds to the display means thereof.

Furthermore, the operation can be made even when the magnification is 1:1, that is, both sizes are equal, and in the copying machine where the operator is capable of setting the variable magnification through the ten-key panel 9, the operation can be performed even when a regular-sized document is copied in variable magnifications onto regular-sized copy paper.

Furthermore, in setting the amount of distribution, if either of the left or right amounts is determined, the other is determined automatically, and therefore either of the blank setting entering keys can be dispensed with, or the setting can be made by entering the rate of distribution on the left or right side.

In accordance with the present invention, constituted as mentioned above, the disadvantages of the blank portion being produced on the copy paper can be eliminated without moving the set position of the document when copying an irregular-sized document in a variable magnification ratio onto regular-sized copy paper, and the copying operation time can be shortened and simplified. Therefore, an improved copying machine is possible with the advantages of a variable magnification function which can operate effectively and run efficiently.

While only certain embodiments of the present invention have been described, it will be apparent to those skilled in the art that various changes and modifications may be made therein without departing from the spirit and scope of the present invention as claimed.

What is claimed is:

1. An electrophotographic copying machine having a variable magnification copying function, said copying machine comprising:

means for detecting and temporarily storing the length of a longitudinal side and the width of a lateral side of a copy document;

means for setting a copy paper size to be utilized in a copying operation;

means for calculating and automatically selecting either a longitudinal or lateral magnification ratio based upon the length and width of said copy document and the length and width of said copy paper, respectively;

indicator means for indicating that selection of said longitudinal magnification ratio will produce a blank portion on the right-hand side of said copy paper;

blank copy range display means for displaying the total blank portion width to be produced on said copy paper;

means for selectively distributing the width of a blank portion on either side of a copy image to be produced on said copy paper;

selected blank display means responsive to said means for selectively distributing, for displaying a numerical value of said blank portion distributed on either side of the copy image; and means for controlling the timing of a copy paper feed operation in response to the respective widths of the blank portions on the sides of the copy image determined by said means for selectively distributing.

2. A copying machine according to claim 1, wherein said means for distributing includes a picture position setting function wherein a left or right blank setting key is actuated after which a numeric value is entered via a keyboard thereby indicating the width of blank portion to be distributed on the left or right side of the copy image, respectively.

3. A copying machine according to claim 1, wherein said means for controlling a copy paper feed timing operation includes means for determining the start of the paper feed operation by dividing the width said blank portion distributed on the left-hand side of said copy document by the speed of the paper feed, thereby accurately positioning said image with respect to the center of said copy paper.

* * * * *